Sept. 27, 1966 L. H. TAYLOR 3,275,918
CONTROL SYSTEM FOR A PLURAL MOTOR DRIVE WITH
LOAD EQUALIZATION
Filed April 21, 1964 11 Sheets-Sheet 1

INVENTOR.
Louis H. Taylor
BY
Webb, Burden, Robinson & Webb
HIS ATTORNEYS

INVENTOR.
Louis H. Taylor
BY
Wall, Burden, Robinson + Webb
HIS ATTORNEYS

INVENTOR.
Louis H. Taylor

INVENTOR.
Louis H. Taylor
BY
Well, Burdon, Robinson & Well
HIS ATTORNEYS

INVENTOR.
Louis H. Taylor
BY
Webb, Burden, Robinson + Webb
HIS ATTORNEYS

INVENTOR.
Louis H. Taylor
BY Webb, Burden, Robinson + Webb
HIS ATTORNEYS

United States Patent Office 3,275,918
Patented Sept. 27, 1966

3,275,918
CONTROL SYSTEM FOR A PLURAL MOTOR
DRIVE WITH LOAD EQUALIZATION
Louis H. Taylor, Youngstown, Ohio, assignor to The
Youngstown Research and Development Company,
Youngstown, Ohio, a corporation of Ohio
Filed Apr. 21, 1964, Ser. No. 361,418
10 Claims. (Cl. 318—99)

This application is a continuation-in-part of my application Serial No. 239,199, filed November 21, 1962, now abandoned, which is a continuation-in-part of my application Serial No. 734,321, filed May 9, 1958, now Patent No. 3,077,800.

This invention relates to electric motor control systems and more particularly to electric apparatus for maintaining deflection of a small diameter work roll of a roll stand substantially at a given position in the roll pass of the stand. This deflection is in a direction with and opposite to travel of metal through the mill, and the small work roll is one of a plurality of rolls of a stand, all of whose longitudinal axes are in substantially the same vertical plane.

Generally, this small diameter work roll is on a 5-high stand, a 3-high stand, a 4-high stand, or a 6-high stand where it is the smallest diameter roll of the stand. On the 5-high stand, it has an upper and a lower intermediate roll each of larger diameter and an upper and a lower backing roll each of greater diameter than the intermediate rolls and each backing roll in frictional engagement with its intermediate roll. This work roll is in frictional engagement with the one intermediate roll and forms with the other intermediate roll a roll pass through which the metal travels and in which it is reduced in thickness.

On the 3-high mill, the roll is the smallest roll and is disposed between two backing rolls, each of which is driven by an electric motor.

On the 6-high mill, this small diameter work roll forms with a larger diameter work roll the roll pass. The diameter of the larger work roll is substantially about two to six times the diameter of the small work roll. The two work rolls are interposed between upper and lower intermediate rolls which, in turn, are interposed between upper and lower backing rolls. The upper intermediate roll is in frictional engagement with one of the work rolls and the lower intermediate roll is in frictional engagement with the other work roll while the upper backing and upper intermediate rolls are in frictional engagement as are the lower intermediate and lower backing rolls.

The given position of the small work roll in the roll pass can be one at which the longitudinal axis of the small work roll is in vertical alignment with the longitudinal axes of the other rolls of the mill or it can be one at which the small work roll is bowed or deflected in a direction with or opposite to travel of metal through the mill. In this latter case, the longitudinal axis of the small work roll is not in vertical alignment with the longitudinal axes of the other rolls of the mill. Selection of the given position is dependent upon production of a desired shape in the rolled metal which in most cases is flat, and takes into consideration crown in the rolls due to shape of the roll bodies and/or to heat generated by reduction of the metal. During the course of rolling, the given position may be changed intentionally to obtain a desired shape in the metal or to maintain shape. This change in the given position may be required because of variations in conditions in the roll pass such as heat build-up in the roll body or bodies or because of variations in the metal itself, such as hard spots or off-gauge.

Driving force or torque for the small work roll results from frictional engagement with at least one backing roll or intermediate roll and from application of forward tension to the metal by a winding reel or another stand on the exit side thereof.

In recent years, there has developed an increasing demand for wide metal strip and sheet, particularly in the very thin gauges such as 0.001" to 0.008" with a special emphasis upon flatness. Although it is recognized that small diameter work rolls readily bite into the metal being rolled, reduce screw pressures and make reductions in gauge of the metal which cannot be made with larger diameter rolls, efforts to use such small diameter rolls, especially those which are too small to be driven through their necks (those with diameters 1" to 4") have been unsuccessful. This has resulted from inability to control the deflection of these rolls in the plane of metal travel through the mill as a consequence of which it has been highly difficult to obtain a specified degree of flatness in the strip or sheet. The uncontrolled deflection or bowing of the small diameter work roll causes over-rolled edges or ripples and/or over-rolled center portions or buckles in the strip. When this occurs in the thin gauges, it is costly and troublesome, if not impossible, to remove the buckles and riffles and off-gauge strip is produced, thereby rendering it unsatisfactory for specifications and orders.

Two factors can cause this deflection, the first being an unbalance of forces acting upon the small work roll and the second being a combination of forces generated by the screwdown mechanism of the stand acting upon the top backing roll and of the tolerances in the bearings and chocks for the backing rolls, intermediate rolls and the work roll. Considering first the deflection caused by the unbalance of forces acting upon the rolls, and referring to FIGURE 1 which shows diagrammatically a 5-high mill, that mill comprises a top backing roll 1 and a bottom backing roll 2 with a top intermediate roll 3 and a lower intermediate roll 4 disposed therebetween. The top intermediate roll is in frictional engagement with the top backing roll, and the lower intermediate roll is in frictional engagement with the bottom backing roll with the backing rolls being driven by electric motors, not shown. However, the intermediate rolls can be driven instead of the backing rolls. Disposed between the two intermediate rolls is a small diameter work roll 5 in frictional engagement with the lower intermediate roll 4 and forming a roll pass with the top intermediate roll 3. Extending through the roll pass is metal strip 6.

A combination of two resulting forces rotates the work roll 5. The first resulting force acts on the top side of roll and comprises a portion of strip delivery tension $T_d$ and a tangential force $F_1$ generated by the top backing roll 1 acting upon the top intermediate roll 3 and extending transversely through the strip thickness to the top part of the work roll 5. The sum of these two forces tends to move the roll 5 towards the delivery side of the mill as shown by arrow 7.

The second resulting force acts on the lower side of the work roll 5 and comprises a tangential force $F_2$ produced by rotation of the lower backing roll 2 in frictional engagement with the intermediate roll 4. The other component of this second resulting force is the entry tension $T_e$ which, together with the tangential force $F_2$, acts to move the work roll 5 towards the entry side of the mill as shown by arrow 8. Consequently, for equilibrium conditions corresponding to a zero lateral deflection and zero bearing loads on the roll, the following condition exists: $(T_e+F_2)=(T_d+F_1)$.

The second factor which causes the deflection results from a combination of forces generated by operation of a screwdown mechanism and of tolerances in the roll bearings and chocks. When the screwdown mechanism lowers the top backing roll and the top intermediate roll to establish a given roll pass to effect a particular reduction, the screwdown mechanism exerts a force on the rolls. This force, in combination with the tolerances between the roll necks, the bearings and/or the chocks and tolerances in the mill housing, may cause the work roll to deflect in the direction with or opposite to travel of strip through the mill. Such deflection occurs because of the small amount of space between the bearings and the roll neck and between the chocks and the mill housings, thus enabling the roll necks and/or chocks to shift or move a small amount when subjected to the screwdown force.

Control over deflection of the small work roll to obtain a desired shape or flatness in the strip encounters further complications from a heat build-up in the rolls, especially during sustained rolling periods. This heat build-up cannot be completely dissipated by flood coolant and generally effects an expansion or swelling commonly called "crown" in a center portion of the small roll and/or in any other roll. Presence of the crown causes overrolling of the center portion of the strip, thereby requiring compensation in the position of the small roll in the roll pass to minimize if not eliminate its effect upon the shape of the strip. Thus, regulation of deflection of the single small roll presents many problems which place severe requirements upon a control system therefor.

Full realization of advantages from use of the single small diameter work roll has been hampered by inability to very quickly effect a correction or compensation for deflection to maintain or return the roll at or to a given position in the roll pass. Since the metal is traveling through the mill at speeds from about 500 f.p.m. to about 6,000 f.p.m., a substantial amount of defectively-shaped strip can result where even a 2–4 second period is consumed in returning the work roll to its given position. Production of defectively-shaped strip is unwanted for it must either be cut out of the coil or the coil diverted to another order, thereby materially increasing costs of manufacture.

My invention permits full utilization of the advantages of the small diameter work roll by maintenance of deflection of the roll at a given position in the roll pass and by ability to effect an extremely fast correction for deviations from the given position. Specifically, it relates to electrical apparatus and comprises a first pair of electric motors at least one of which is drivingly connected to a first output shaft in turn connected to one driven roll of a rolling mill and a second pair of electric motors at least one of which is drivingly connected to a second output shaft also in turn connected to a second driven roll of a rolling mill. An armature of one of the first pair of motors is connected electrically in series with an armature of one of the second pair of motors to form a first neutral point between the series connection. An armature of the other of the first pair of motors is connected electrically in series with an armature of the other of the second pair of motors to form a second neutral point between the series connection. Between the first and second neutral points is a neutral circuit. The armature of the one of the first pair of motors and the armature of the other of the second pair of motors are connected to one side of a source of electrical power which drives all of the motors. The armature of the other of the first pair of motors and the armature of the one of the second pair of motors is connected to the other side of this source of electrical power. Connected into the neutral circuit is a current-producing means which generates a current for increasing the armature current in one of the two pairs of motors and for decreasing the armature current in the other of the two pairs of motors to effect changes in apportionment of output torque between the two shafts. Connected to the current-producing means is a means for actuating same.

Preferably, the current-producing means is such that the changes in apportionment of output torque between the shafts are effected without substantially affecting the amount of total torque delivered to the two shafts by the motors.

Accordingly, control over the deflection of a small diameter work roll results from effecting changes in apportionment of applied torque by the motors between the driven rolls through sensing amount and direction of deflection of the work roll from the given position. From this sensing, a signal related to the amount of deflection and related to the direction thereof is generated and then from the signal an error signal related to the difference between the sensed position of the work roll and the given position of the work roll and related to the direction of deflection is produced. Thereafter, the error signal is utilized in regulation of output torque of the electric motors for effecting the changes in apportionment of applied torque to the driven rolls to maintain the small work roll substantially at the given position. Preferably, the sensing of deflection of the small work roll includes sensing the rate of change of deflection and the signal is related to the rate of change of deflection. Further, the error signal is related to the rate of change of difference between the sensed position and the given position of the small work roll.

In one embodiment of my invention, a current related to the magnitude of the error signal and related to the direction of the error signal is produced from this error signal and then applied to the electric motors for effecting the changes in apportionment of applied torque to the driven rolls to maintain the small work roll substantially at the given position. The current which is produced from the error signal is applied preferably to the armatures of the electric motors to effect the changes in apportionment of applied torque, but it can alternatively be applied to the fields of the electric motors to effect the changes in apportionment. One such current which I have employed comprises a first part which is substantially continuous, is related in magnitude to the amount of the deflection and related to the direction of the deflection. This current also has a second part which is pulses of short duration related in magnitude to the amount of the deflection and related to the direction of deflection. The first part is a major portion of the current and requires a longer time interval to effect a change in apportionment of applied torque than the second part.

I prefer to effect these changes in apportionment of applied torque without substantially affecting the amount of total torque delivered to the driven rolls. Such as accomplished by increasing amount of applied torque to one of the driven rolls by increasing output torque of the motor or motors connected thereto, while simultaneously decreasing the amount of applied torque delivered to the other driven roll by decreasing output torque of its motor or motors. In this way, the small work roll is brought back from its deflected position towards the given position. In practice of my method, I can so carry out the sensing of deflection and utilization of the error signal that deflection of the small work roll is maintained within a range of substantially ±0.0005" of the given position. A range of deflection of ±0.005" can be used for some rollings. This range of deflection in which the small work roll is maintained is in part dependent upon the flatness of the strip, the width of the mill and the diameter of the small roll.

The small work rolls to which my invention has particular application may have diameters ranging from about ¾" to about 5".

In the accompanying drawings, I have shown preferred embodiments of my invention, in which.

Figure 1:
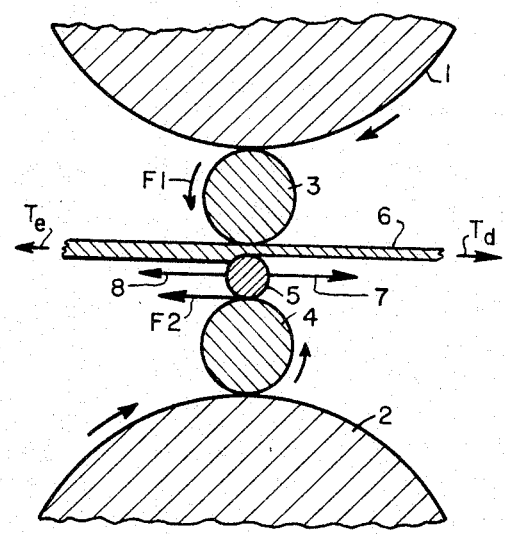
FIGURE 1 is a schematic side view of the rolling mill which incorporates the characteristic features of my invention.
Figure 2:
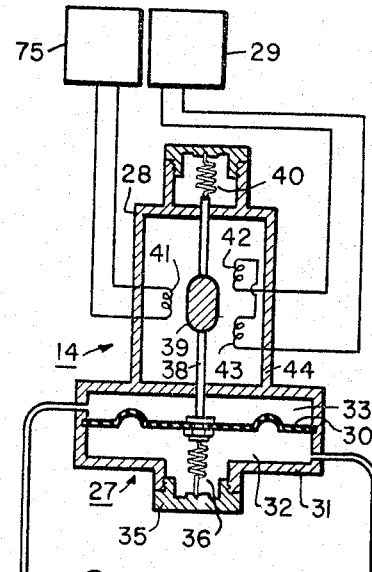
FIGURE 2 is a schematic view of one device for detecting deflection of the single small roll of a 5-high mill.
Figure 2:
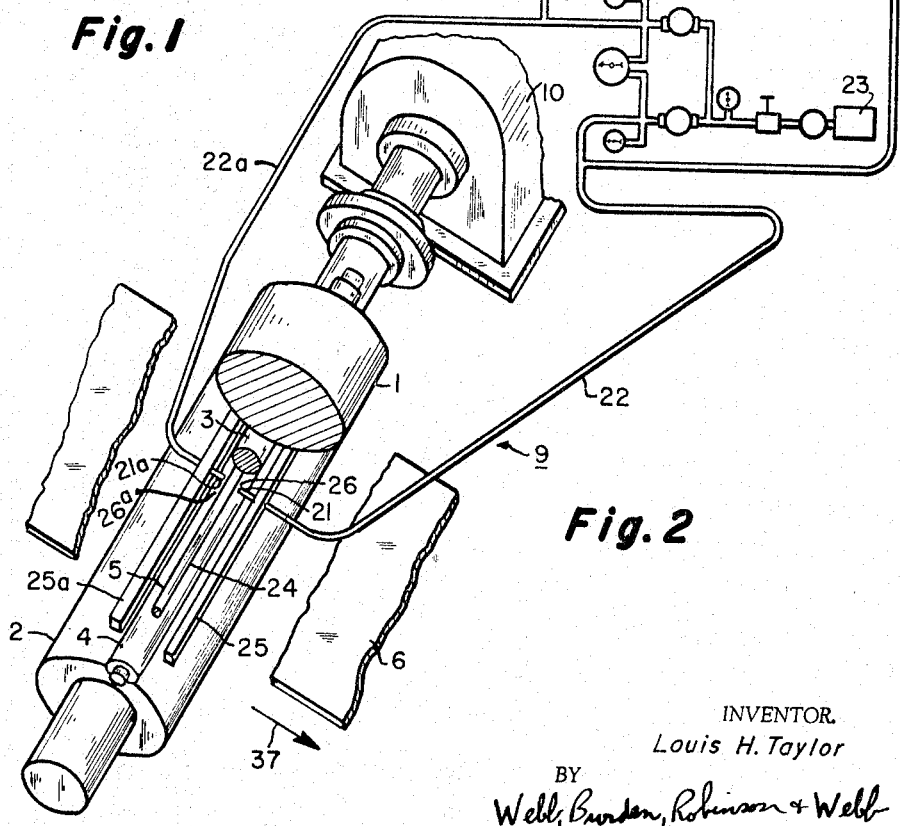
Figure 3:
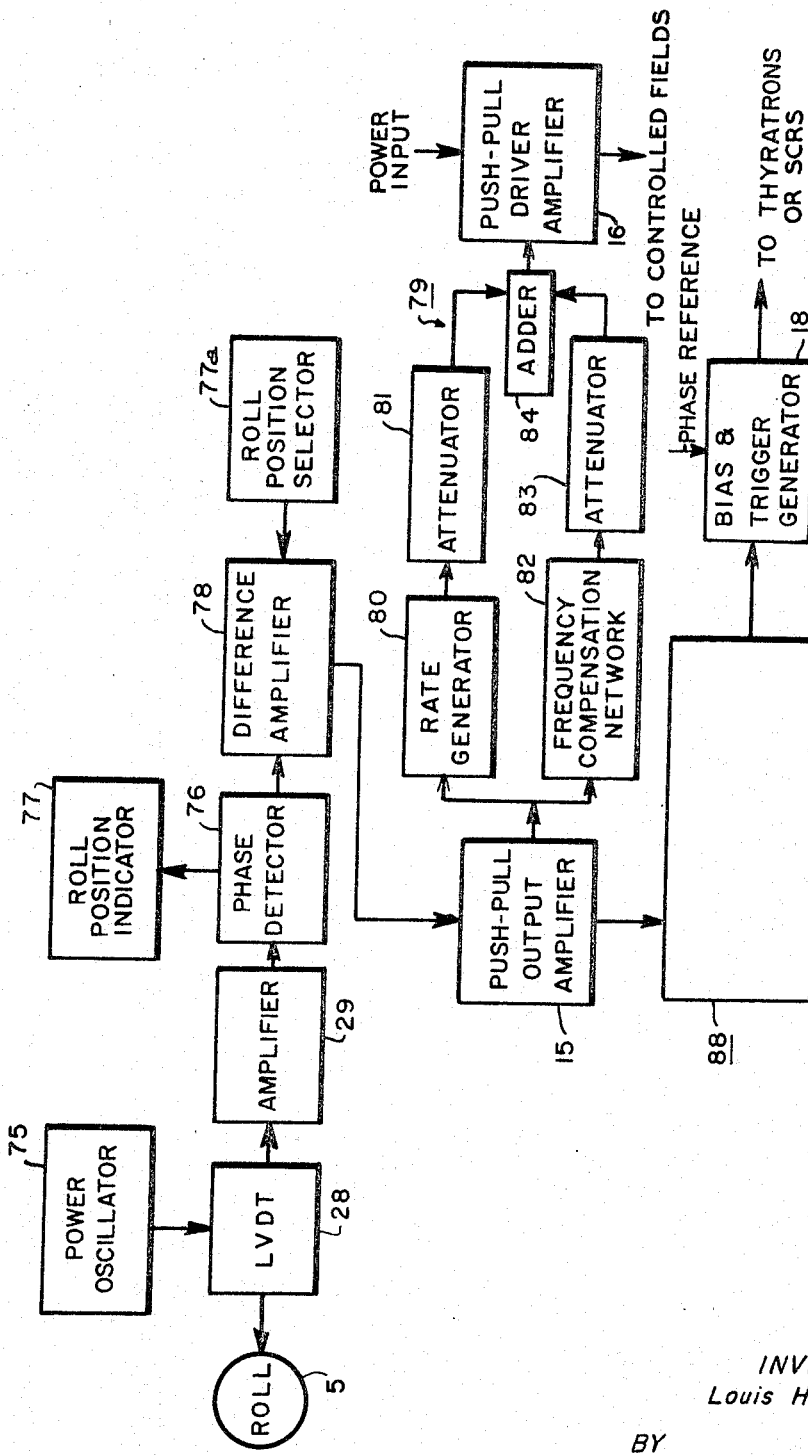
FIGURE 3 is a block diagram of apparatus for generating the error signal which is used to maintain deflection of the roll at a given position.
Figure 4:
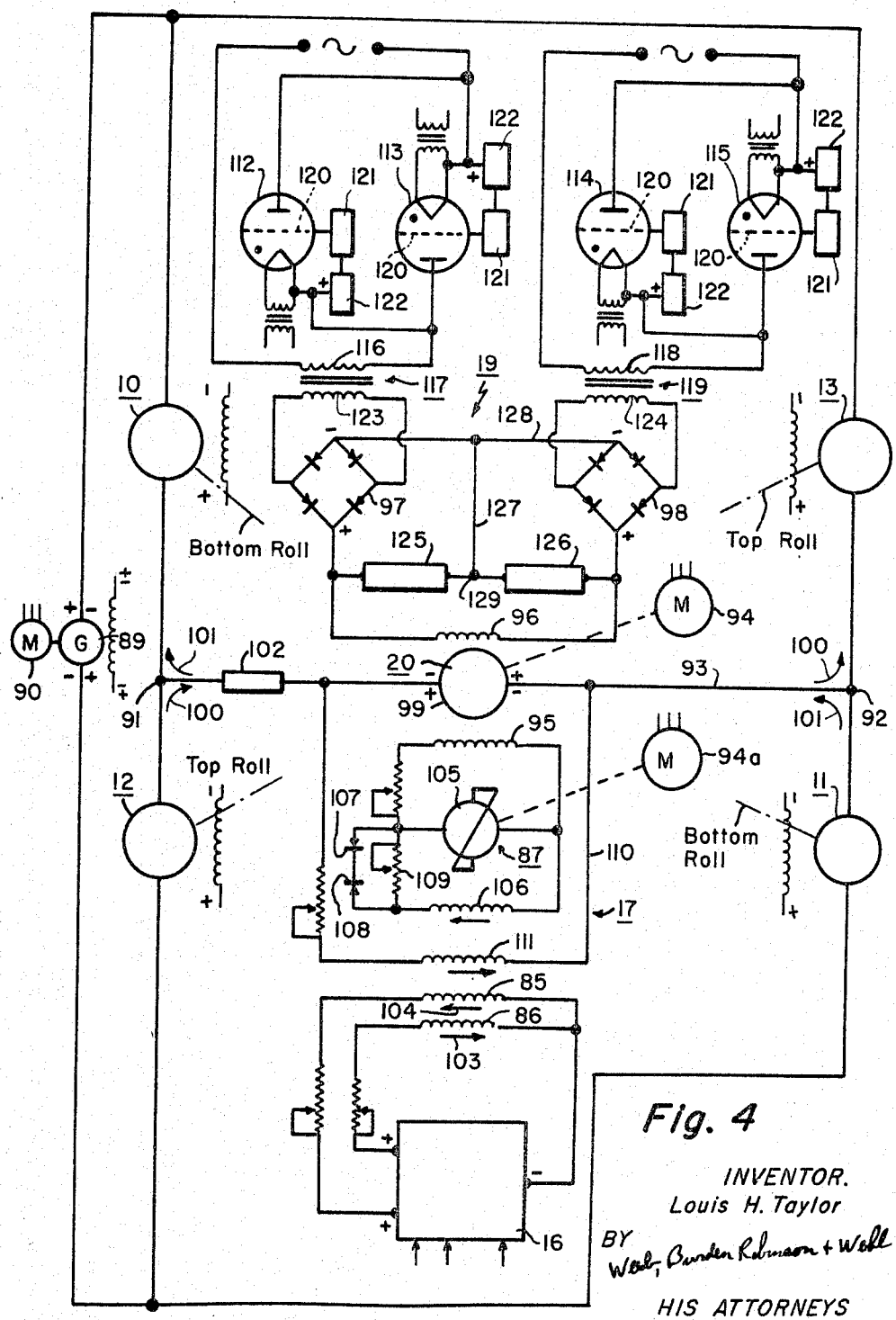
FIGURE 4 is a schematic wiring diagram of one embodiment of a slow acting regulating system and a fast acting regulating system which receives the error signal and generates therefrom a reversible push-pull continuous current and reversible push-pull pulses of current for producing the regulated buck-boost output armature current.

Referring to FIGURES 2, 3 and 4, the 5-high mill of FIGURE 1 mounts apparatus 9 for detecting deflection of the single small diameter work roll 5 in a roll pass formed by the upper intermediate roll 3 and the small diameter roll itself. As shown, the lower backing roll 2 is driven by two motors 10 and 11 connected in tandem with motor 10 being shown in FIGURE 2, and the top backing roll is driven by two motors 12 and 13 connected in tandem. The upper intermediate roll 3 is in frictional engagemnt with the upper backing roll 1 and the lower intermediate roll 4 is in frictional engagement with the lower backing roll 2. Although I have shown the roll drive connected to the backing rolls, it may alternatively be joined to the intermediate rolls, one of which also functions as a backing roll for the work roll 5.

Connected to the sensing apparatus 9 is a signal generator 14 which produces from deflection of the roll 5 a signal related in magnitude and related to direction of the deflection. This signal travels to a push-pull output amplifier 15 (FIGURE 3) where a first portion continues to a push-pull driver amplifier 16 whose output is delivered to a slow acting regulating system 17 (FIGURE 4) and a second portion advances to a bias and trigger generator combination 19 whose output is transmitted to a fast action regulating system 19. The slow regulating system produces a reversible push-pull substantially continuous current and the fast regulating system generates reversible push-pull pulses of current of short duration. These two currents are fed to a buck-boost generator 20 whose output is applied to the armatures of the motors for driving the backing rolls 1 and 2. By boosting the armature current of one roll drive motor combination and bucking the armature current of the other roll drive motor combination, I effect a change in apportionment of torque applied to the driven rolls 1 and 2 to maintain the roll 5 at or return it to a given position in the roll pass.

Considering the sensing apparatus of FIGURE 2, nozzles 21 and 21a connected to conduits 22 and 22a leading from a source of fluid under pressure such as air or liquid straddle both sides of the roll 5, are substantially opposite the face 24 of the roll 5, and are substantially in alignment with the center line of the roll and substantially midway between the ends of the face 24 thereof so that deflection of the roll 5 in the direction with or opposite to strip travel through the roll pass is toward one nozzle and simultaneously away from the other nozzle. Safety bars 25 and 25a mount and position the nozzles opposite the roll face.

These nozzles are located close to the roll face across gaps 26 and 26a between the ends of the nozzles and the roll face so that deflection of the roll 5 produces a change in pressure of the fluid under pressure in the conduits. Preferably, the length of the gaps between the nozzle and the roll face is from about 0.005" to about 0.005" when the roll and its intermediate and backing rolls are in axial alignment as shown in FIGURE 1.

Within the range of deflection of the roll 5, impingement of two jets of air or fluid against the roll face produces back pressure in the conduits 22 and 22a with this back pressure being less when the roll is deflected away from from one nozzle to lengthen the gap and greater when the deflection is toward the nozzle to shorten the gap. When the rolls 5, 1, 2, 3 and 4 are in axial alignment, impingement of the two jets against the roll face produces equal amounts of back pressure in the conduits 22 and 22a. The back pressure affects the pressure of air or fluid forming the jet and as the gap shortens, the back pressure increases and as the gap lengthens, it decreases. Accordingly, as the work roll 5 deflects toward the nozzle 26, back pressure in the conduit 22 increases, thereby reducing the strength of the jet from the nozzle 26 and increasing pressure in the conduit 22. Simultaneously, the roll 5 deflects away from the nozzle 26a and decreases back pressure in conduit 22a accompanied by an increase in pressure of the jet from the nozzle 26a and a decrease in pressure in the conduit 22a. This change in strengths of the jets and the changes in pressures in the conduits are used for detection of roll deflection and the magnitude of the changes are related to the amount of deflection and the direction of change dependent upon an increase or decrease in pressure.

To convert changes in fluid pressure in the conduits into a signal for controlling operation of the mill, the conduits are connected to a signal generator 14 comprising a transducer 27 and a linear variable differential transformer (LVDT) 28 whose output its transmitted to an amplifier 29. The operation of this transducer 27 and the linear variable differential transformer is described in my Patent No. 3,077,800.

Referring to FIGURE 3, the linear variable differential transformer 28 has connected thereto an oscillator 75 which supplies A.C. power of high frequency therefor. The signal output of this linear variable differential transformer advances to an amplifier 29 where it is amplified and forwarded to a phase detector 76. This detector rectifies the A.C. roll position signal to provide a D.C. voltage related to the displacement of the roll from its given position in the roll pass with a polarity indicating the direction of the displacement.

A roll position selector 77a produces an adjustable reference D.C. voltage so that a position at which the roll is maintained can be selected by a mill operator. This reference D.C. voltage along with the output of the phase detector 76 is fed to a difference amplifier 78 which provides an output voltage or error signal related to the difference between the actual roll position and the desired position chosen on the selector 77a. The output voltage signal from the amplifier 78 is related in magnitude to the amount of deflection and is related to the direction of deflection.

The push-pull output amplifier 15 receives the output D.C. voltage signal from the difference amplifier 78 and provides sufficient power to drive two separate push-pull circuits which deliver portions of the output voltage signal of the amplifier 78 to the fast acting regulation system 19 (FIGURE 4) and the slow acting regulation system 17. A first portion of the output of this push-pull amplifier 15 is transmitted to one separate push-pull circuit 79 comprising a rate generator 80 and an attenuator 81 connected in parallel with a frequency compensation network 82 and a second attenuator 83. This first portion, like the output voltage signal of the amplifier 78, has a magnitude related to the amount of deflection and is related to the direction of deflection. The rate generator 80 is a differentiating circuit that gives an output signal related to the velocity of the deflection.

The frequency compensation network 82 controls the higher frequency phase of the circuit and amplitude response of feedback circuits to be described hereinafter.

The attenuators 81 and 83 control the gain of a feedback loop and the amount of dampening.

The output of this parallel circuitry advances to an adder 84 which combines the roll position error signal of the compensation network 82 and the rate signal of the rate generator 80 in the proper phases to produce an output error signal. This signal is fed to the slow regulation system 17 through the push-pull driver amplifier 16, which is in circuit with two control fields 85 and 86 of a rotating amplifier 87 (FIGURE 4), such as Amplidyne, Rototrol, Regulex regulators.

A second portion of the output of the push-pull amplifier is transmitted to a second separate push-pull circuit 88 identical to that circuit 79 comprising the rate generator 80, frequency compensation network 82, the two attenuators 81 and 83 and the adder 84. From the circuit 88, the resulting output error signal is transmitted to the bias and trigger generator 18 connected to thyratrons which are a part of the fast acting regulating system 19.

The reference voltage produced by the roll position selector 77 is carefully regulated so that it does not fluctuate with line voltage, load or temperature changes. This reference voltage is derived from a calibrated roll position setting potentiometer located on the mill and convenient for the operator to select a given position. This reference voltage is then used to preselect the performance level required of the regulated quantity which is a current difference corresponding to torque differentials in the mill motor armatures.

Maintenance of the small roll in the given position requires that overall performance of the regulating system consisting of the fast and slow systems prevent over- or undershooting which can bring about oscillations of various frequencies in the roll. In this regard, various time constants of various elements of the mill, both electrical and mechanical, which add up to an overall time constant, must be taken into consideration and each individual time constant reckoned with in designing the regulating system to prevent oscillation.

It has been found that time constants in the various components of the electrical system can be varied within reason by changes in $L/R$ ratios of each circuit. In this connection, the $L/R$ ratio can be shortened by increasing R through addition of external resistors which, of course, effect power losses and require an increase in size or capacity of components in the circuits.

The given position referred to in this application includes a small band of movement such as plus-minus 0.0005", and on wide mills, may be plus-minus 0.005". Within this small band of movement, I achieve regulation of deflection of the roll so that the deflection does not exceed on either side of a given line substantially parallel to the longitudinal axis of the rolls, the ranges set forth.

In order to achieve very fast and careful regulation of deflection of the roll, it is mandatory that the upper and lower driven mill rolls have separate motors to permit effecting a change in the apportionment of the torque applied by the motors to the driven rolls, and preferably effecting the change in apportionment of the torque between the two roll drives without affecting the total amount of torque imparted to the rolls themselves. It is further preferable that the change in apportionment be made without affecting the main generator's current output. The foregoing roll drive, in combination with my dual regulating system, achieves correction for roll deflection in intervals such as 4 to 17 or 20 milliseconds.

Referring to FIGURE 4, a main generator 89, driven by an A.C. motor 90, is connected to the mill motors 10, 11, 12 and 13 with mill motors 12 and 13 driving the top backing roll 1 and connected in parallel, and mill motors 10 and 11 driving the lower backing roll 2 and connected in parallel. Mill motor 10 is in series electrically with mill motor 12, as is mill motor 11 in series electrically with mill motor 13, and motors 11 and 12 are connected to one side of the generator 89 and motors 10 and 13 are connected to the other side of this generator.

Connected across natural neutral points 91 and 92 on line 93 in the mill motors' power circuits is the buck-boost generator 20 driven by its A.C. motor 94.

The buck-boost generator has a main field 95 connected to the Amplidyne regulator 87 of the slow acting regulation system 17, and a fast field 96 is in circuit with the fast acting regulating system 19. The fast field is a relatively few-turn coil of heavy wire for current input from two back-to-back connected bridge rectifiers 97 and 98 so that the output from the bridges is transformed to field flux which adds to or subtracts from the flux of the main field 95. On the other hand, the main field 95 is a relatively high impedance winding having more turns per coil of small size wire.

Since the buck-boost generator experiences rapid changes in field flux, its field frame is preferably a laminated construction of good grade electrical sheet for fast response and low hysteresis and eddy current losses.

Through addition to or subtraction from the field flux of the main field 95 and the fast field 96 of the buck-boost generator 20 by operation of the fast and slow systems 17 and 19, I produce a steep rise or fall in induced voltage of the armature 99 of the generator 20 and provide a corresponding steep rise or fall buck-boost output armature current. Accordingly, the armature current of the generator 20 flows in either direction in line 93, as indicated by arrows 100 and 101 (FIGURE 4) and increases the armature current in the upper roll drive motors in direction 100, while simultaneously decreasing armature current in the lower roll drive motors. This effects a change in the apportionment of torque delivered by the two roll drives and thereby moves the small work roll towards the given position or maintains same thereat. Of course, flow of the armature current of the booster in the direction of arrows 101 has the opposite effect as to increasing armature current in the bottom roll drive and decreasing it in the top roll drive. Thus, the total amount of torque imparted to the driven rolls remains substantially the same but the amount of torque delivered to one driven roll relative to the other driven roll is affected whereby correction for deflection and maintenance of the roll substantially at the given position is achieved.

Forcing the fields 95 and 96 of the buck-boost generator 20 with higher than normal field supply voltage from the slow acting regulation system 17 and the fast acting regulation system 19 produces a fast response from the generator 20. Additionally, an external resistor 102 in series with the generator armature 99 reduces the time constant of the regulated power circuit, including the mill motors 10, 11, 12 and 13 by reducing the $L/R$ ratio. However, use of this resistor is not essential.

Considering the slow acting regulation system 17, the Ampliyne regulator 87 is driven by the A.C. motor 94a and has the two matched high impedance control fields 85 and 86 connected to the driver amplifier 16. One field's connection is reversed as to the other so that when each receives an equal amount of D.C. output voltage from the amplifier 16, the resultant magnetic field flux is zero for one cancels the other.

The driver amplifier 16 (FIGURE 3) includes circuits which affect its time-rate output such as gain, rate feedback, bias and adjustable time constants, and additionally, has two output push-pull circuits which receive the push-pull signal from the adder 84. When the push-pull signal is received by the driver amplifier 16, one output voltage is raised an amount equal to that that the other output voltage is lowered. Which output circuit has its voltage raised is dependent upon the direction of deflection of the roll 5, and the amount of raise and of reduction is dependent upon the amount of deflection of the roll.

Application of this D.C. output voltage from the driver amplifier causes one control field 85 or 86 to drive to a higher excitation level, while the other control field is driven to a lower excitation level to effect a net ampere turn current in one direction or the other to induce a voltage in the armature of the Amplidyne. Arrows 103 and 104 indicate the direction of voltage induced in the armature 105 of the Amplidyne 87 by control fields 85 and 86. Accordingly, the armature 105 of the Amplidyne delivers a variable and directional excitation current to the main field 95 of the buck-boost generator 20 which current must have reversible polarity to effect maintenance of the roll 5 in the given position.

A negative feedback for the armature 105 of the Amplidyne comprises a differential field 106 connected across the armature 105 and a network of back-to-back connected zener diodes 107 and 108. This negative feedback improves transient performance and stability of the Amplidyne and reduces its residual voltage. Additionally, it serves as a voltage limiter for the output of the Amplidyne by shorting out a trimmer resistor 109 in the differential field circuit of the Amplidyne regulator 87 through the back-to-back connected zener diodes selected for a proper cut-off voltage.

A positive feedback circuit 110 couples the output voltage of the booster generator 20 to the Amplidyne through a field 111 which is adjusted to hold the Amplidyne output and, in turn, the buck-boost generator's output voltage at any level up or down to which level the control fields have pushed the Amplidyne upon receipt of the error signal. Additionally, the positive feed-back circuit maintains the booster voltage at that level with a zero signal so that it performs substantially the same function as a servo-motor driven potentiometer. Thus, if an error signal is present, the slow system 17 is quickly driven to adjust operation of the roll drive motors to correct the error and the slow system is held at that correction level of operation so that no further operation of the Amplidyne occurs until receipt of a new error signal. If this were not the case, then a continuous signal would be required for operation of the Amplidyne.

In actual operation of the mill, receipt of error signals occurs at a rapid rate whereby a small level of output plus-minus from the driver amplifier 16 is generally present as the roll deviates from the given position in either direction.

Referring to the fast reaction regulating system 19, it comprises two pairs of back-to-back or cross-connected thyratron tubes 112 and 113 and 114 and 115 with the output of thyratrons 112 and 113 fed to the primary winding 116 of a first transformer 117 and the output of tubes 114 and 115 fed to the primary winding 118 of a second transformer 119. Joined to the grids 120 of each thyratron tube is the trigger generator 121, and to the cathodes thereof the bias 122 of the combination 18 whereby upon receipt of a signal from the trigger generator, one of the two pairs of thyratrons is fired with the direction of deflection of the roll determining which pair.

The trigger generator includes adjustment circuits such as a proportional control and a rate control which singly or in combination effect firing of the thyratron and the conduction angle, thereby directly affecting output inasmuch as once a thyratron tube is fired, it conducts only during the remainder of the half-cycle A.C. wave. The output of the thyratron is dependent upon a time-degree relationship of triggering or firing and generally, output is less than a 180° conduction angle.

The secondary 123 of the first transformer 117 delivers its output to the first full wave bridge rectifier 97 and the secondary 124 of the second transformer 119 delivers its output to the second full wave bridge rectifier 98 connected together on the negative side with the first bridge rectifier. The positive terminals of the two bridges are joined to the fast field 96 of the buck-boost generator 20 and to even value loading resistors 125 and 126 disposed in series with an electrical connection 127 between the common negative line 128 and a midtap 129 between the two resistors.

As long as the push-pull signal from the trigger generator is present, the pair of thyratrons fired thereby are conducting and thereby energizing their transformer for the duration of the signal. The A.C. output of the transformer is converted to D.C. power by the bridge of its pair of thyratrons and this D.C. power is delivered to the fast field 96 of the buck-boost generator 20 where it is transformed to magnetic energy with a steep rise which adds to or subtracts from the main field flux of the generator and thus affects the output of the generator in a steep rise or fall pattern.

The output of the two full-wave bridge rectifiers 97 and 98 is push-pull and is reversible in that if bridge 97 is energized, current flows therefrom through field 96, then through resistor 126, back to the negative side of the bridge. At the same time, the bridge also self-loads through resistor 125 and the common connection 127. The output of the other bridge is the same except that the current through the fast field is reversed so that this fast field undergoes a magnetic polarity change with each change in firing of one of the pairs of thyratrons.

Where both thyratrons are overlapped on conduction, then at one instant and at some value depending on the degree of overlap, both bridges will have exactly the same voltage output in which event the load current drops to zero for there are no potential differences thereacross. At this point, the bridges will both self-load through their respective resistors 125 and 126.

The slow system 17 performs the major portion of the work for maintaining the roll at the given position and for returning the roll to the given position when it has moved away therefrom through delivery of a substantially continuous current. The amount of output current supplied by the slow system is dependent upon such factors as the difference between the amount of exit and entry tensions and the magnitude of the roll pressures' angular component which can be substantial especially when rolling thin gauges and which tends to force the roll 5 out of the given position, and also upon an unbalance in forces imposed upon the roll which unbalance requires compensation or correction by substantially steady or continuous output current. This slow system cannot satisfactorily effect all the regulation required because of its long time constant which may range up to about 20 seconds.

Transient conditions in the strip such as a sudden change in gauge, a hardness area in the strip etc., if not very quickly compensated for by the fast regulating system, will quickly offset the small roll and then there is an unreasonably long time consumed to return it to a given position. During this time, a substantial amount of malshaped or defective strip results so that it is necessary to superimpose upon the slow system the fast system to take care of the transient conditions and to dampen the slow system as to oscillatory tendencies so that the gain of the slow system can be made higher than is possible without the fast system.

The two systems act independently and jointly to effect correction or compensation for maintenance of the roll at its given position. For example, when the buck-boost generator is driven towards a rising voltage left to right, viewing FIGURE 4, to add to the top roll drive torque and bridge 97 is fired, it will be an addition to the buck-boost output from the slow field. In the event bridge 98 is fired due to a slight overcorrection of bridge 97, the slow system cannot change the buck-boost generator armature polarity fast enough, but the output from the booster armature is reduced and overcorrection is avoided.

When the roll 5 deflects out of its given position, one bridge is cut off and the other bridge continually conducts until the slow system catches up and forces the roll back to the given position. When a transient condition occurs, the fast system operates very quickly in the order of 4–20 milliseconds to maintain the roll in substantially the given position.

Figure 5:
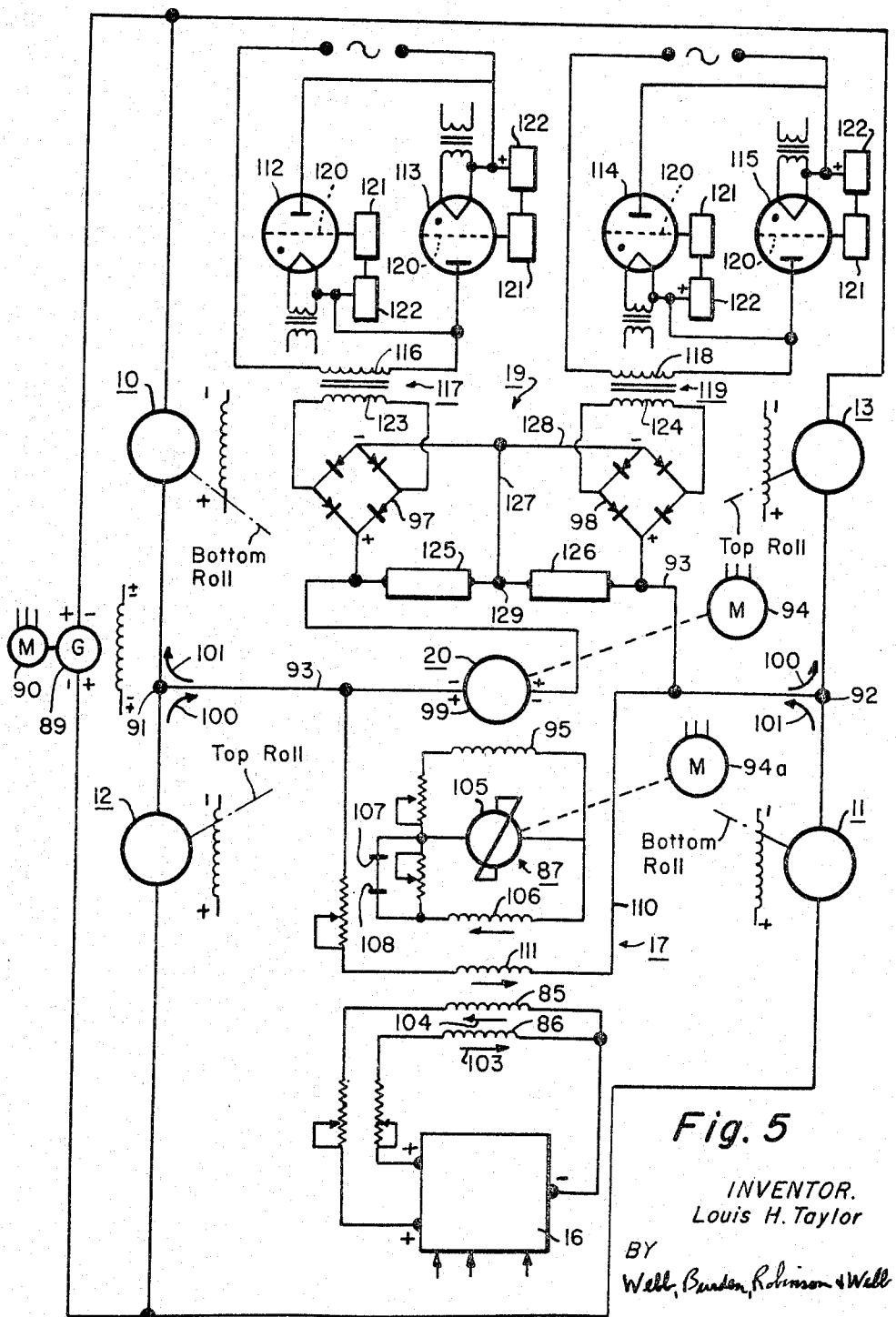
FIGURE 5 is a schematic wiring diagram showing a first modification of the embodiment of FIGURE 4.

FIGURE 5 shows a modification of the embodiment of FIGURE 4, wherein the fast field 96 of the buck-boost generator is omitted and the resistors 125 and 126 connected to the bridges 97 and 98 are in series with the generator armature 99 and in the neutral circuit 93. In operation of this modification, where bridge 98 aids the generator 20 from left to right, it self-loads through resistor 126 while bridge 97 subtracts from the generator's output through increased voltage drop in loading resistor 125 which is a part of the generator's output circuit from 91 to 92.

In this modification, the thyratrons 112, 113, 114 and 115 are connected in the same way and operated in the same manner as described regarding the embodiments of FIGURE 4. The bridge diodes of the bridges 97 and 98 must be of sufficient size or rating to conduct the entire generator's output current plus their self-loading current.

Figure 6:
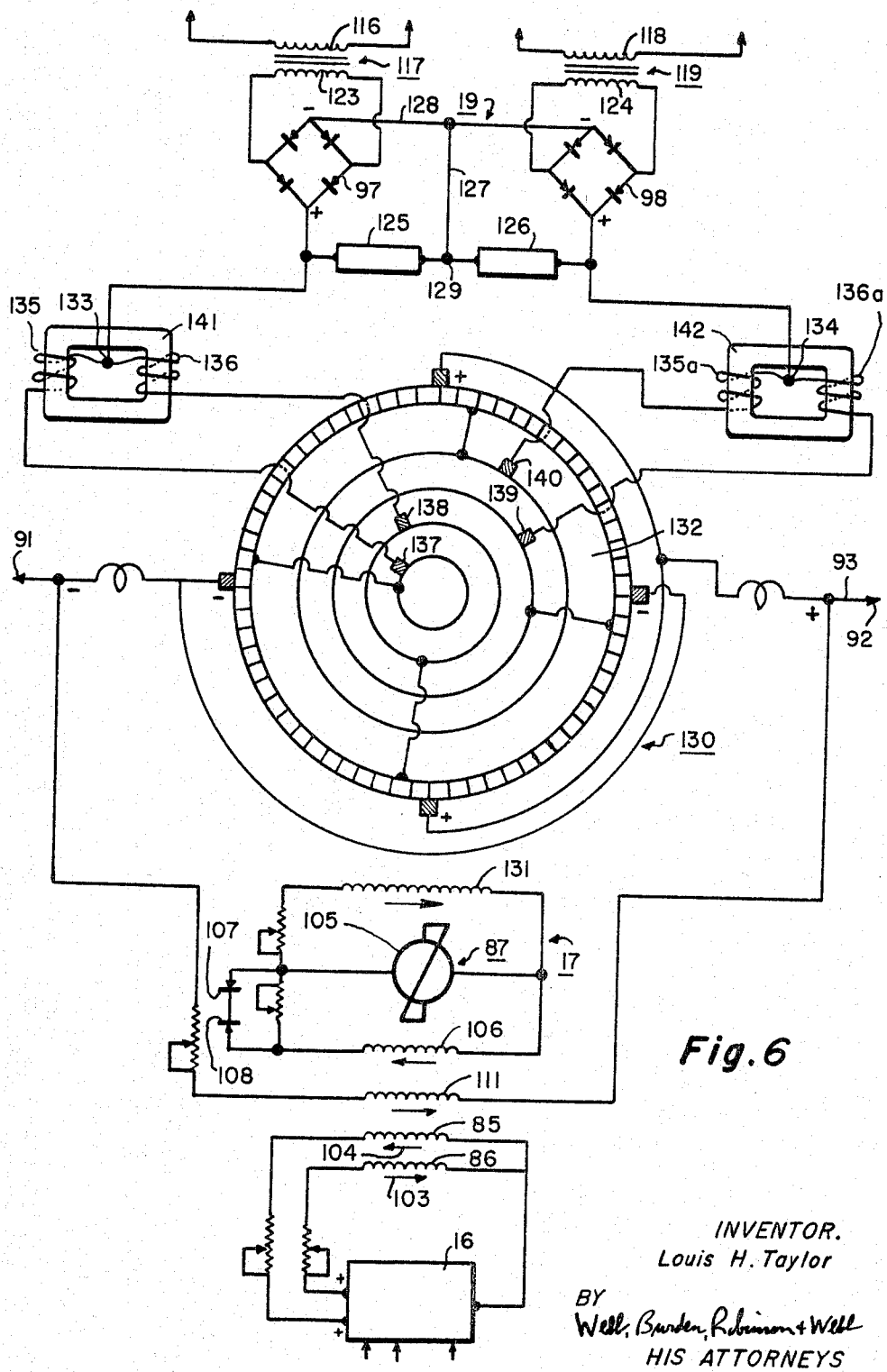
FIGURE 6 is a schematic wiring diagram of a second modification of the embodiment of FIGURE 4.

FIGURE 6 shows a modification of the embodiment of FIGURE 4 wherein a 3-wire generator 130, such as a Dobrowolsky machine, replaces the buck-boost generator 20. This generator has a main field 131 connected to the Amplidyne regulator 87 which has the same fields as those of the embodiment of FIGURE 4, an armature 132 connected into the neutral line 93 between the motors 10 and 12 and 11 and 13 (not shown) of FIGURE 4, and two derived external neutral points 133 and 134 into which the output of the thyratrons 112, 113, 114 and 115 (not shown) of FIGURE 4 is fed through the back-to-back connected bridges 97 and 98. These neutral points are formed from A.C. outputs of the armature winding tapped at one-pole pitch intervals and brought to slip rings provided in addition to the normal commutators which are the D.C. output terminals of the machine.

As shown, two pairs of coils 135 and 136 and 135a and 136a of high reactance and low resistance are connected across two pairs of slip rings 137 and 138 and 139 and 140, and are disposed upon cores 141 and 142, respectively. The voltage between slip rings 137 and 138 and 139 and 140 is alternating and a small A.C. current is always present in the reactance coils 135, 136, 135a and 136a when the bridges are not conducting. The midpoint of each reactance coil is tapped to form the neutral points 133 and 134 and the D.C. output of the bridges is fed into its coil where it divides at the midtap so that one-half of the total current flows in each direction around the core which has no resulting D.C. magnetization.

The two derived external neutral points 133 and 134 provide introduction of the current pulses from the bridges 97 and 98 into the armature circuit of the generator 130. This effects direct introduction of the current pulses into the armature circuit of the generator 130 and thereby eliminates a fast field in the generator 130 and, consequently, avoids interaction between the fast and main fields of the generator 130.

The main field 131 functions the same as the main field 95 of the buck-boost generator 20.

Figure 7:
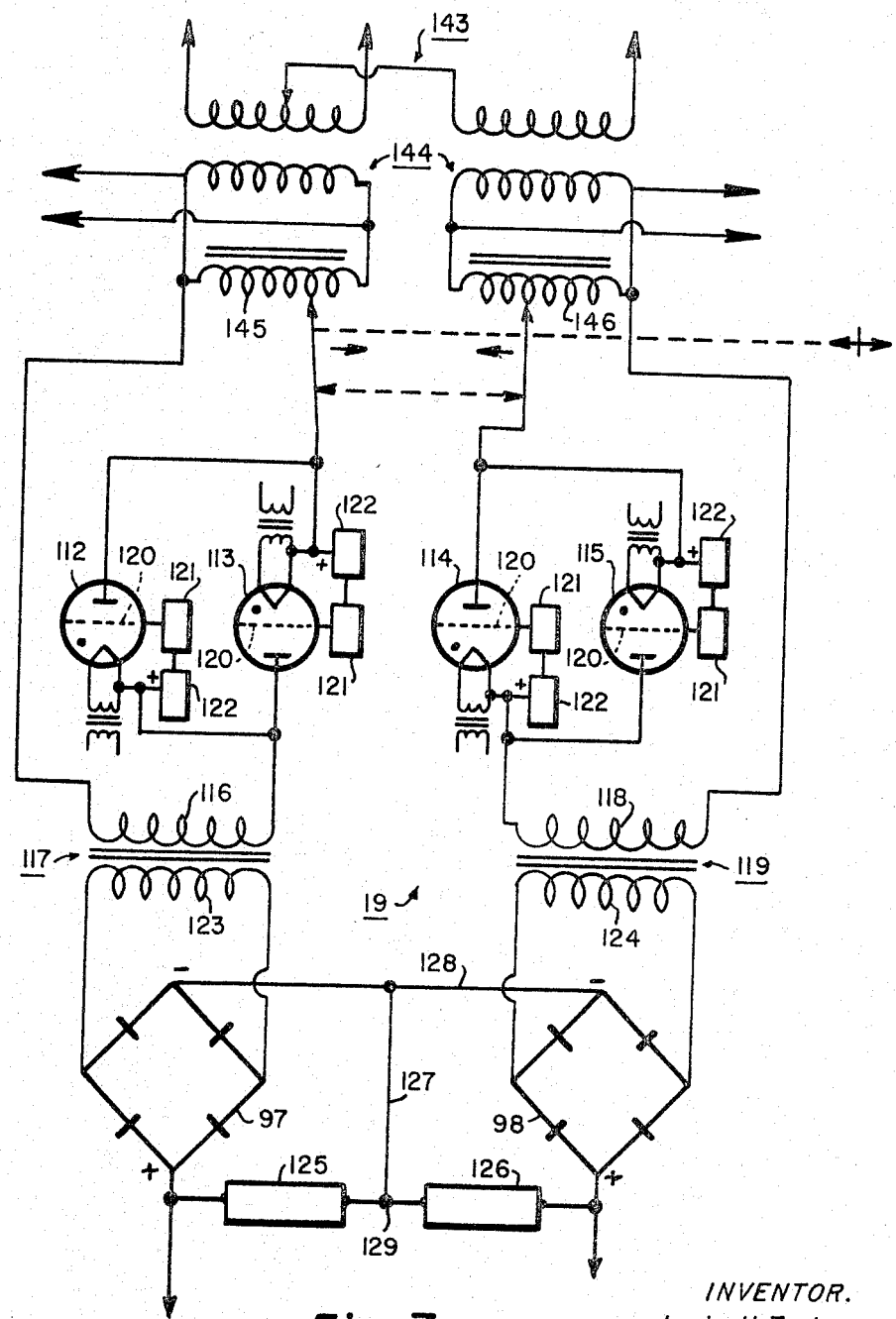
FIGURE 7 is a schematic wiring diagram of a second fast regulating system for the embodiment of FIGURE 4.

FIGURE 7 shows electric circuitry which provides reversible D.C. pulses of the fast system 19 at a ¼-cycle from a commercial frequency, 3-phase A.C. power source. In this circuitry, a 3-wire, 3-phase A.C. power source 143 is converted to a 2-phase, 4-wire output in the transformer 144. The outputs of the isolated 2-phase side of the transformer 144 are isolated independent 1-phase voltages with 90° phase angle which are fed to the bridge transformers 117 and 119 of the bridges 97 and 98 by gang operated, individual ring core autotransformers 145 and 146 with sliding contacts.

In this arrangement, the bridges 97 and 98 supply ¼-cycle D.C. push-pull pulses from 3-phase, 60-cycle power which on a 60-cycle per second basis is 4⅙ milliseconds. These short pulses result from firing one thyraton only in each bridge for ½-cycle on the A.C. wave with the two firings overlapping each other by 90° to effect the ¼-cycle D.C. output.

Figure 8:
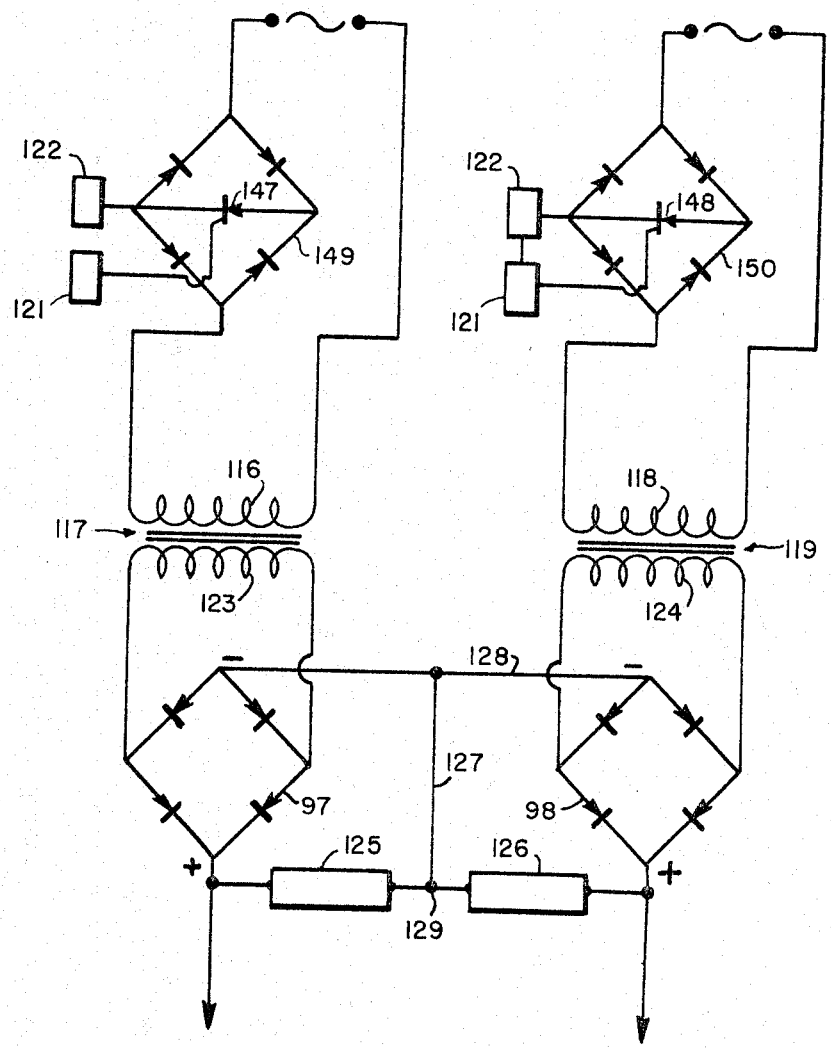
FIGURE 8 is a schematic wiring diagram of a third fast regulating system for the embodiment of FIGURE 4.

FIGURE 8 shows a fast regulating system which uses two silicon controlled rectifiers 147 and 148, commonly referred to as SCRs, in combination with solid state silicon rectifier devices in place of the two pairs of thyratrons.

As shown, SCRs 147 and 148 are connected across two corners of full-wave bridges 149 and 150, respectively, comprising silicon diodes which have adequate peak reverse voltage rating for the input A.C. supply voltage. Each full-wave bridge applies a full-wave rectified voltage to its SCR which will either absorb the voltage or apply it to the primary winding of the transformer in circuit therewith as determined by the phasing of the gate or triggering circuit, similar to the thyratron's triggering. Thus, one SCR will do the work of two thyratrons as it can be gated, fired or triggered every ½ cycle on the A.C. wave.

Where each roll drive has a single motor instead of two motors, the armatures of the two motors are connected in series across the main generator 89 with the series connection between the two motors forming one natural neutral point. To this arrangement, I provide a balancer set comprising two motors series connected across the main generator and free to rotate without a mechanical load joined thereto. The series connection between the two balancers provides the other neutral point of a neutral line similar to that of FIGURE 4, so that the buck-boost generator and the fast acting and slow acting systems are similarly employed to effect correction and compensation for movement of the roll out of its given position.

One modification of my invention uses two roll drive motors connected in parallel across the main generator with a buck-boost generator in series connection through its armature with each mill motor. One buck-boost generator aids its motor, while the other opposes its motor since the outputs of the two buck-boost generators are opposite in direction. The fast regulating system feeds the fast field of the two boosters connected in series therewith while the slow system feeds the main fields of the two boosters also connected in series therewith.

Figure 9:
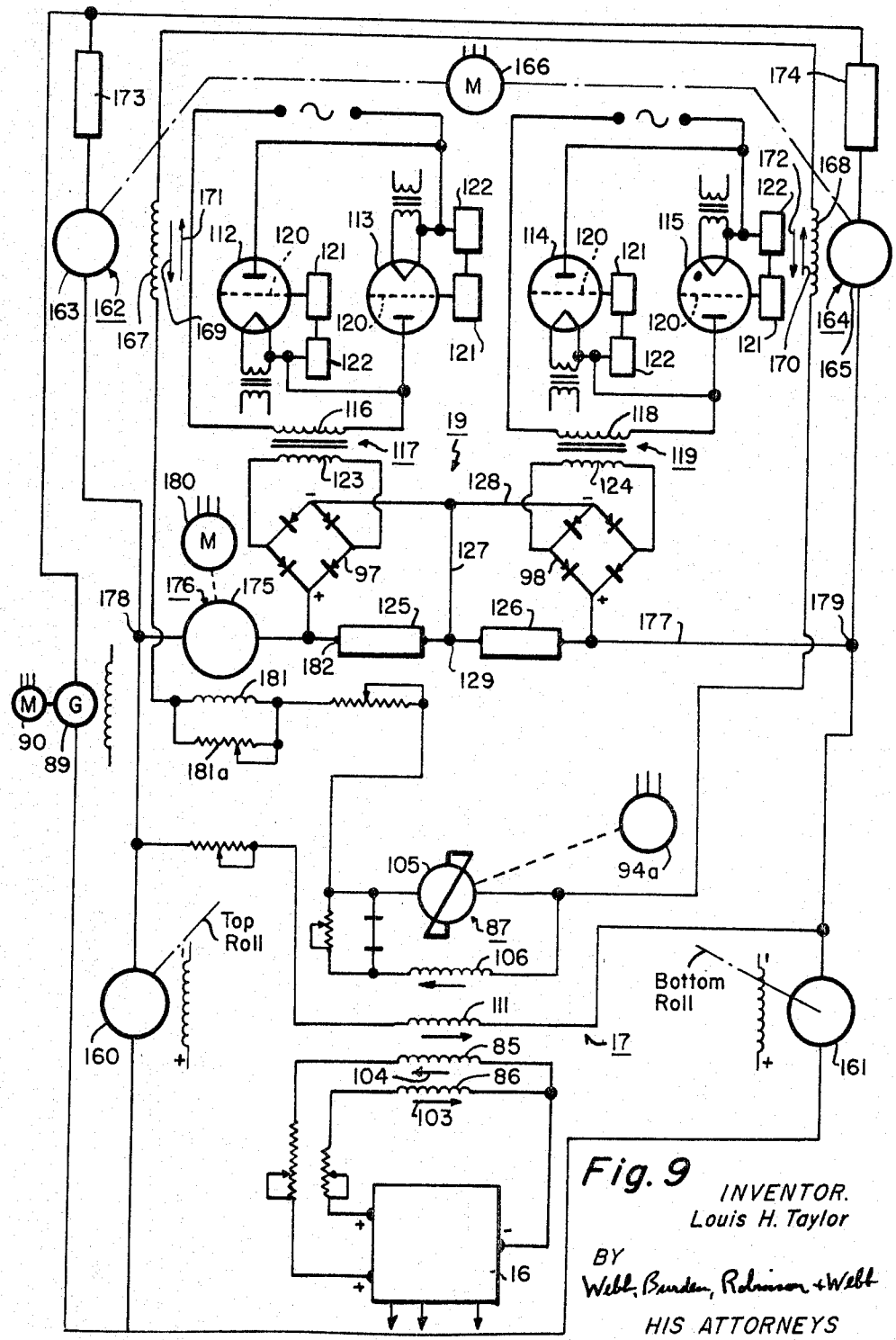
FIGURE 9 is a schematic wiring diagram of a third modification of the embodiment of FIGURE 4.

FIGURE 9 shows a single mill motor 160 for driving the upper backing roll 1 and a second single mill motor 161 for driving the lower backing roll 2. These two motors 160 and 161 are connected in parallel across the main generator 89 with a first buck-boost generator 162 in series connection with the motor 160 through its armature 163, and with a second buck-boost generator 164 in series connection with the motor 161 through its armature 165. This series connection of the buck-boost generators with their motors is such that the output voltages of the two buck-boost generators are opposite in direction. Thus, one buck-boost generator aids its motor while the other buck-boost generator opposes its motor. Accordingly, the motor being aided takes a larger share of the main generator output current, while the other motor takes a lesser share of this output current. Consequently, a change in apportionment of torque to the driven rolls is effected to maintain or return the roll 5 at or to its given position.

An A.C. motor 166 has a connection with both buck-boost generators 162 and 164.

The buck-boost generators 162 and 164 have main fields 167 and 168, respectively, which are joined to the armature 105 of the Amplidyne 87 in series. For one direction of Amplidyne output, arrows 169 and 170 indicate the direction of voltage induced in the armatures 163 and 165 of the buck-boost generators 162 and 164. For the other direction of Amplidyne output, arrows 171 and 172 indicate the direction of voltage induced in the armatures 163 and 165.

Resistors 173 and 174 in series with motors 160 and 161 and the armatures of the buck-boost generators 162 and 164, respectively, are useful to reduce the regulating current demand on the fast system 19.

Output of the fast regulating system 19 of FIGURE 9 is through an armature 175 of a buck generator 176 in series connection with resistors 125 and 126 in push-pull relation with the two bridges 97 and 98. The armature 175 and the resistors 125 and 126 are in circuit 177 which extends between neutral points 178 and 179 of the motors and buck-boost generators' circuits.

As shown, the buck generator 176 is driven by an A.C. motor 180, but it may be driven by the A.C. motor 166 joined to the buck-boost generators 162 and 164. Voltage for the field 181 of the buck generator 176 with parallel trimmer resistor 181a of the field 181 is supplied by the Amplidyne regulator 87. The fields 167, 168 of the buck-boost generators 162 and 164 and the field 181 of the buck generator 176 are connected in series.

The field parameter of the buck generator 176 is adjusted by its parallel trimmer resistor 181a so that its armature voltage matches and follows the voltage of the two buck-boost generators 162 and 164 which is across the neutral points 178 and 179 in either direction as determined by polarity reversal set by the slow system 17.

The armature polarity of the buck generator 176 is opposite to that across the neutral points 178 and 179 in either direction so that the bridges 97 and 98 have zero voltage across their output connection points, namely, from point 182 to point 179 in the circuit 177.

In addition to the thyratrons and SCRs, ignitrons produce satisfactory results when connected in the same way as the thyratrons.

A substitute for the Amplidyne regulator is a static type regulator such as magnetic amplifiers with rectified D.C. outputs and silicon controlled rectifiers in combination with silicon diodes to provide a full-wave rectified D.C. output. These are arranged in push-pull circuitry with loading resistors to produce reversible output polarity or are used singly with two electrically isolated main fields of the buck-boost generator.

Figure 10:
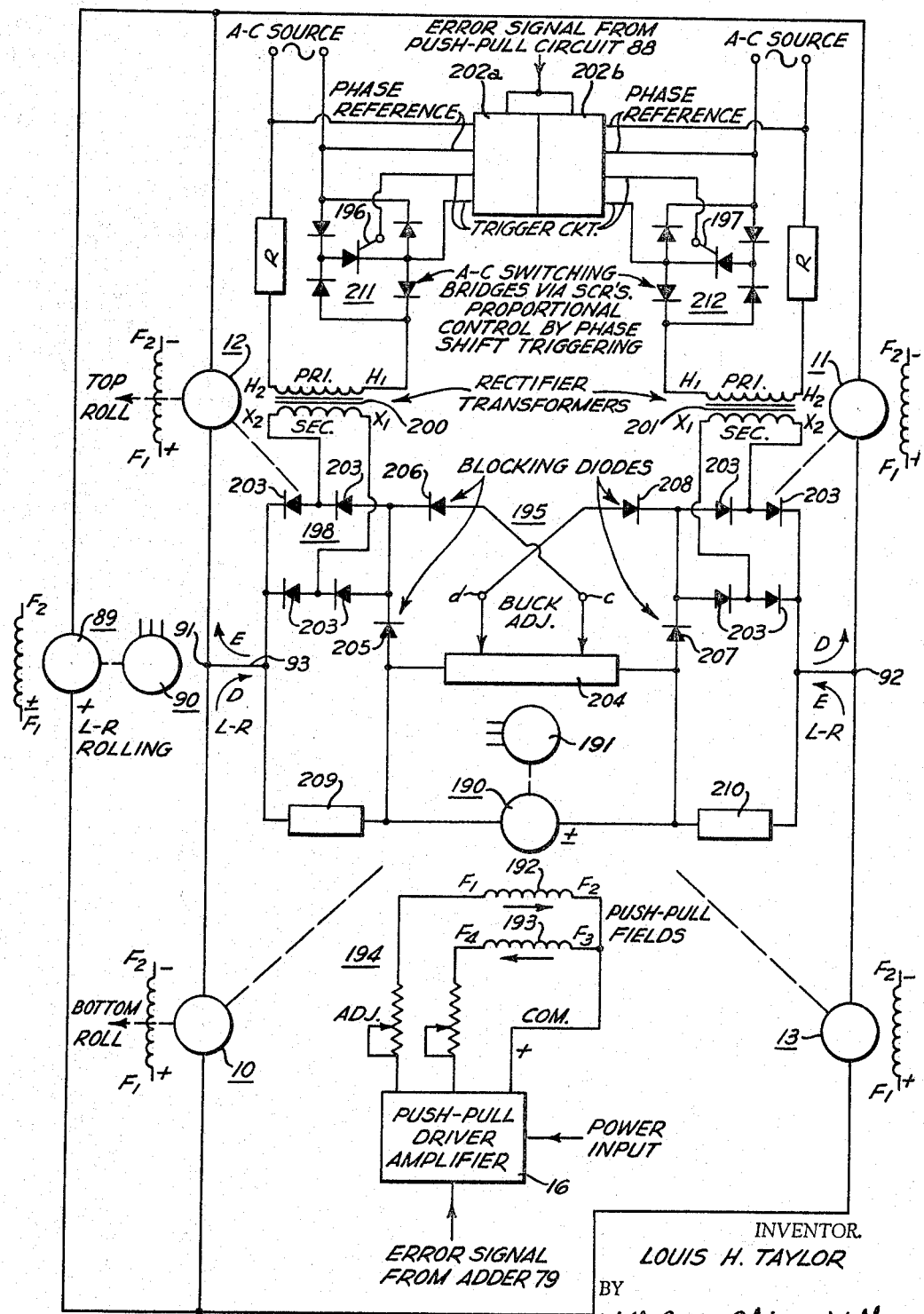
FIGURE 10 is a schematic wiring diagram of a fourth modification of the embodiment of FIGURE 4.

FIGURE 10 shows a further embodiment of a slow and fast regulating system applied to a four-motor mill drive with a pair of tandem-arranged motors operatively connected to each driven roll. This system has natural neutral points 91 and 92, electrically connected by line 93, and the motor armatures connected into two circuits series pairs to provide a constantly variable and directional armature shunting of the pairs of the motors without affecting output of the generator for a given reduction. Accordingly, current division is affected and thereby output torques of the pairs of the motors to effect changes in amounts of output torque of the top and bottom roll drives in response to the error signal. Such changes are made quickly and free from overshooting and hunting.

This FIGURE 10 system uses the same main generator 89 and motors 10–13 arranged and connected as in the system of FIGURE 4, and has a rotating booster 190 driven by an A.C. motor 191 and connected into the line 93 between the neutral points 91 and 92. The booster 190 is a low residual voltage machine with two 100% ampere turn shunt fields 192 and 193 connected in push-pull relationship to the driver amplifier 16 and forms the slow portion 194 of the system.

The fast portion 195 of the FIGURE 10 system employs silicon controlled rectifiers 196 and 197 (SCRs) to energize one of the bridge rectifiers 198 or 199, depending upon the direction and magnitude of the error signal, through operation of rectifier transformers 200 and 201 interposed between the SCRs 796 and 197 and the bridges 198 and 199. The D.C. output voltage of the bridge rectifiers 198 and 199 is delivered to the line 93 and added to or subtracted from the output of the booster 190 to effect very fast changes in apportionment of output torque from the motors 10–13.

The SCRs receive the error signal through gate pulse generators 202a and 202b, one of which is operable dependent upon the direction and magnitude of the error signal. The bridge rectifiers comprise silicon rectifier diodes 203.

Connected across the booster is a voltage divider resistor 204 which in combination with blocking diodes 205, 206, 207, and 208, unblocks the bridge rectifiers when bucking the current in the neutral line 93. The blocking diodes 205–208 prevent shorting out of the end portions c or d of the voltage divider 204 regardless of the booster's polarity, and provide a conducting path for that rectifier bridge (198 or 199) which is operated by the error signal to buck the current in line 93 as maintained by the booster 190, or as suddenly raised by operation of one of the rectifier bridges 198 or 199.

The voltage from the rectifier bridges 198 and 199 is added to the voltage of the booster 190, and, therefore, instantly is available. However, this is not the case when one rectifier bridge 198 or 199 is required to suddenly buck the current in line 93, for this bridge is actually blocked by a voltage drop which takes place across resistors 209 or 210 which are in circuit with the armature of the booster 190. End portions of the voltage divider 204 across the booster are so adjusted that the voltage at c is the same at the anode or negative end of the bridge 198 as the voltage at its cathode or positive end as at neutral point 91. This voltage then is the drop in the resistor 209 plus the drop in the armature of the booster 190. In effect, there is a small current such as 1–5 amperes through the rectifier bridge 198 when the transformer 200 is not energized. The other end portion d of the voltage divider 204 is likewise so adjusted that the same conditions take place on bridge 199.

As shown in FIGURE 10, the fast system includes A.C. switching bridges 211 and 212, each with an SCR, but a pair of back-to-back connected or inverse parallel SCRs can be substituted for each A.C. switching bridge. For control over the deflection of the small work roll, the firing circuitry of the SCRs is arranged for phase-retarding controlled firing on the half-cycle wave, i.e., to retard or advance the firing. Thus, in the case of a large error signal, full conduction or fully advanced firing of the SCR is required; while for a small or diminishing error signal, less conduction is needed and the firing is retarded.

The two resistors 209 and 210 are required to by-pass the two bridge rectifiers because of the reversing polarity needs of both the fast and slow portions of the control current in line 93. These resistors 209 and 210 are helpful in reducing the time constant of the circuitry; however, they do this at the expense of increased power demand.

A further embodiment of my invention comprises substitution of a balancer set for the two motors 11 and 13 of the system of FIGURE 10, wherein the balancer set is two electrically rotating machines, such as a pair of electric motors smaller than the motors 11 and 13 and drivingly connected to each other. In this embodiment, a modified FIGURE 10 system, motor 10 drives the bottom roll and motor 12 drives the top roll. The pair of smaller electric motors, the balancer set, are disposed and connected as motors 11 and 13 of the FIGURE 10 system, except that the output shafts of these smaller motors are connected to each other instead of to the top and bottom roll drives. The balancer set performs substantially the same functions electrically as the motors 11 and 13 in the FIGURE 10 system, and permits a single motor to drive the top driven roll and a single motor to drive the bottom driven roll.

Figure 11:
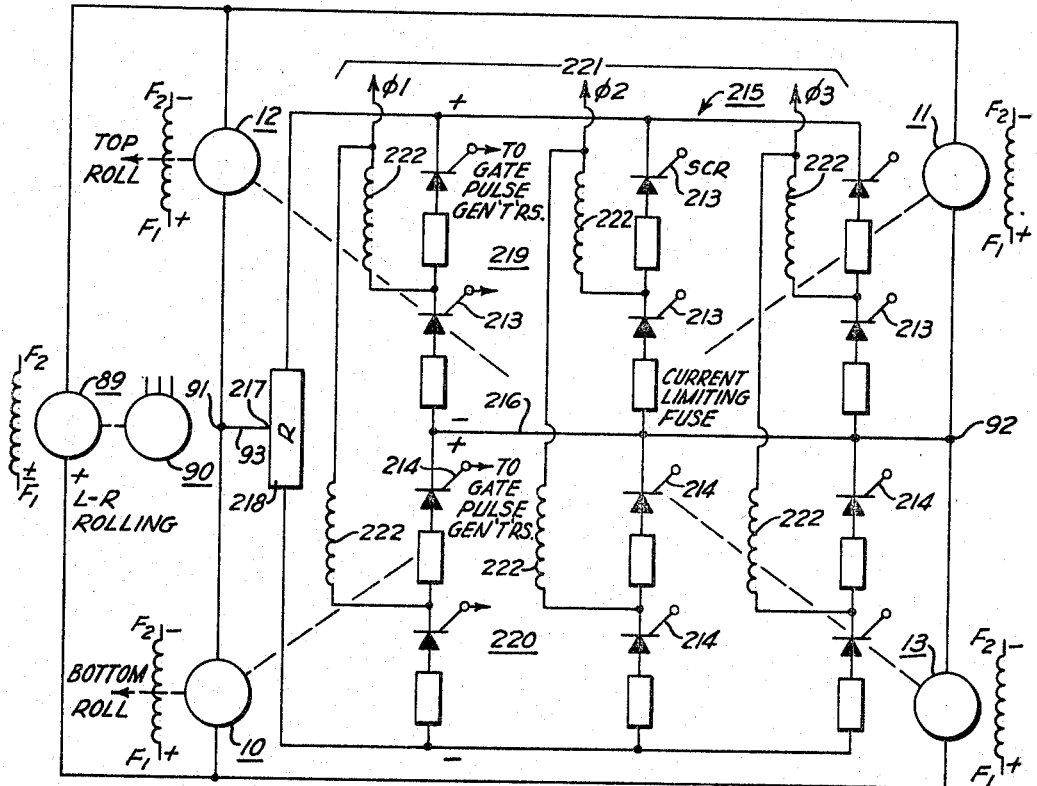
FIGURE 11 is a schematic wiring diagram of a system which receives the error signal and generates therefrom a current which is delivered to the armatures of the electric motors which are drivingly connected to rolls of the mill for effecting changes in apportionment of applied torque to the driven rolls.

FIGURE 11 shows a regulating system for effecting the changes in apportionment of applied torque. This system lacks a slow portion and uses back-to-back connected SCRs 213 and 214 which are in rectifier bridges 219 and 220, respectively, to form an adjustable voltage, reversing polarity regulator 215 connected by line 93 between the neutral points 91 and 92 of the same four D.C. mill motors 10–13 operated by the generator 89 shown in FIGURE 10. The back-to-back connected SCRs 213 and 214 are joined to a common line 216 which forms one output terminal of the regulator 215 whose other output terminal is the center tap 217 of a coupling resistor 218. One-half of this coupling resistor 218 is in the neutral circuit and serves a dual role: first, to improve the response of the system by decreasing the time constant, L/R ratio, of the regulated circuit; and, second, to connect the free D.C. output ends of the two rectifier bridges 219 and 220 and these serve as a surge protector or limiter. These two rectifier bridges 219 and 220 have a common 3-phase input 221 and are protected against surge A.C. currents by an air core reactor 222 in each phase.

Figure 12:
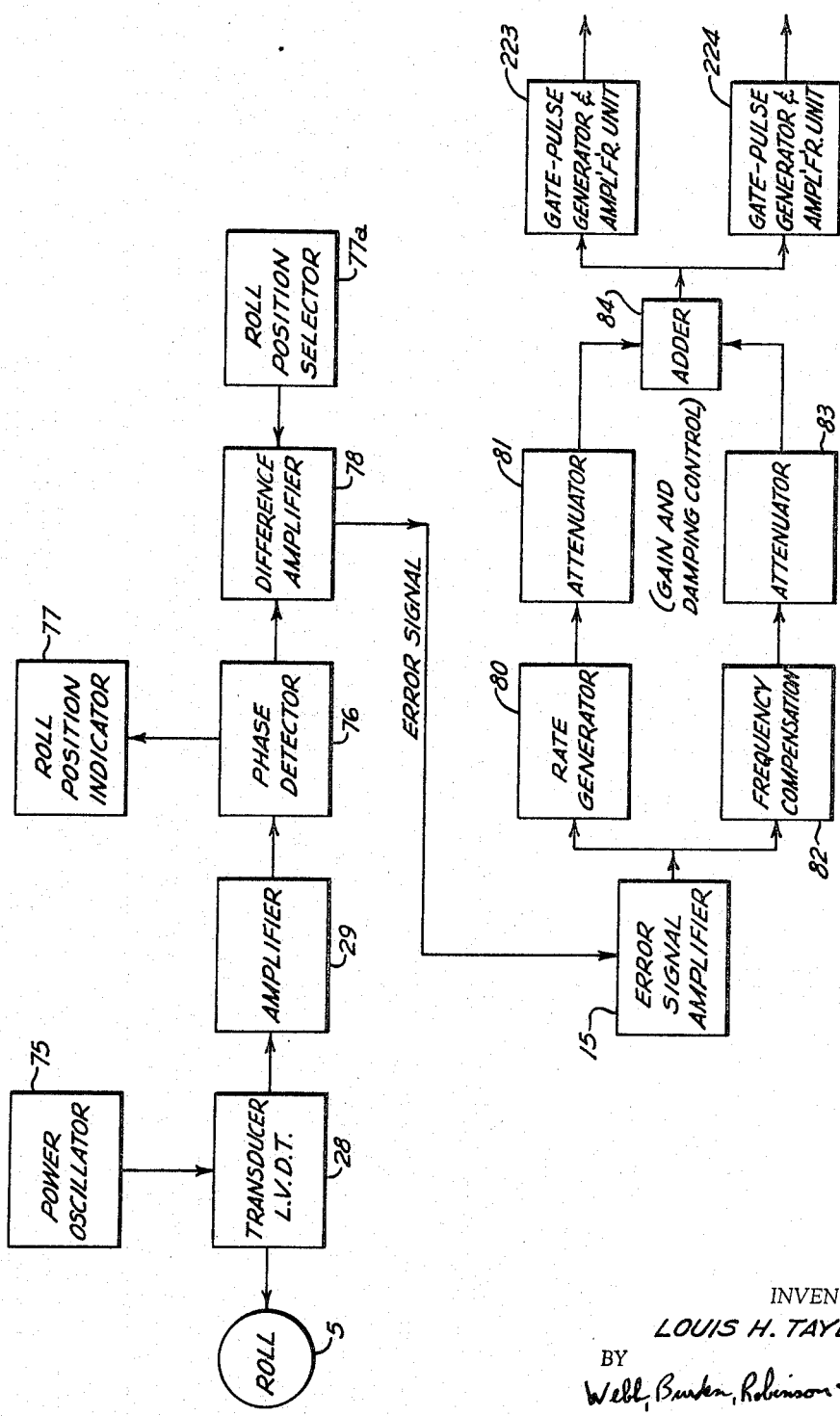
FIGURE 12 is a block diagram similar to that of FIGURE 3, but adapted to the system of FIGURE 11.

Firing of the SCRs of one or the other of the two rectifier bridges 219 and 220 is effected through that gate pulse generator 223 or 224 which receives the error signal, and, of course, which particular rectifier bridge is fired is dependent upon the direction of the error signal. As shown in FIGURE 12, this errror signal is received by the gate pulse generators 223 and 224 from the adder 84. Depending upon which direction the deflection of the small work roll is to be changed by effecting change in apportionment of applied torque, the system of FIGURE 11 generates a current in the neutral circuit which increases output torque of either the two motors connected to the top driven roll or the two motors connected to the bottom roll, while simultaneously decreasing the output torque of the other pair of motors the same amount without affecting the output of the generator 89. To produce the increase and decrease of output torque of the motors 10–13, the system of FIGURE 11 very quickly produces a current which affects operation of these motors to bring about the changes in apportionment of applied torque to the driven rolls.

The system of FIGURE 11 also operates satisfactorily through a common source of single-phase A.C. power input of proper voltage commensurate with D.C. output voltage.

My invention has important advantages which include:

(a) Ability to utilize a single small diameter work roll for rolling extremely thin gauge strip and sheet such as 0.001" to 0.008" in wide widths up to 50" and above while producing excellent flatness in the metal.

(b) Ability to maintain the single small diameter work roll in a given position in the roll pass and/or to purposely maintain the roll at a given position where there is a small amount of deflection therein either in the direction with or opposite to strip travel to obtain a given shape in the rolled metal.

(c) Ability to effect excellent control over the shape of the very thin strip and sheet through extremely fast correction and compensation for deflection away from the roll's given position where the deflection is caused by transient conditions such as hard spots or areas, small off-gauge areas, etc., and/or from a deviation from equilibrium conditions between the forward and back tensions and that angular component of force of the roll pressure which tends to force the roll out of its given position.

(d) Ability to make use of tungsten carbide work rolls.

(e) Ability to control position of the single small work roll in the roll pass so as to compensate for heat build-up or crown while producing a high degree of flatness in extremely thin gauges.

While I have shown and described preferred embodiments of my invention, it may be otherwise embodied within the scope of the appended claims.

I claim:
1. Electric apparatus comprising a first pair of electric motors at least one of which is drivingly connected to a first output shaft, a second pair of electric motors at least one of which is drivingly connected to a second output shaft, an armature of one of said first pair motors connected electrically in series with an armature of one of said second pair motors to form a first neutral point between said series connection, an armature of the other of said first pair motors connected electrically in series with an armature of the other of said second pair motors to form a second neutral point between said series connection, a neutral circuit between said first and second neutral points, said armature of said one of said first pair motors and said armature of said other of said second pair motors being connected to one side of a source of electrical power which drives all said motors, said armature of said other of said first pair motors and said armature of said one of said second pair motors being connected to the other side of said source of electrical power, current producing means connected into said neutral circuit and producing a current which increases the armature current in one of the two pairs of motors and decreases the armature current in the other of the two pairs of motors to effect changes in apportionment of output torque between said two shafts, means connected to said current producing means for actuating same.

2. The apparatus of claim 1 characterized by said motors of said first pair being connected to said first output drive shaft and by said motors of said second pair being connected to said second output drive shaft, and by said current producing means being such that said changes in apportionment of output torque between said shafts are effected without substantially affecting the amount of total torque delivered to said two shafts by said motors.

3. The apparatus of claim 1 characterized by said current producing means including a first operative means which produces a substantially continuous current and a second operative means which produces pulses of current of short duration.

4. The apparatus of claim 1 characterized by said current producing means being a rotating booster with fields connected in push-pull relationship and being two silicon controlled rectifiers each of which is in electrical connection with a rectifier bridge whose output is applied to said neutral circuit, said rotating booster producing a substantially continuous current and said silicon controlled rectifiers producing pulses of current of short duration.

5. The apparatus of claim 1 characterized by said current producing means being an adjustable voltage, reversing polarity regulator formed by a pair of rectifier bridges including back-to-back connected silicon controlled rectifiers, said rectifier bridges being resistor coupled, said reversing polarity regulator being connected into said neutral circuit.

6. The apparatus of claim 2 characterized by said current producing means including a first operative means which produces a substantially continuous current and a second operative means which produces pulses of current of short duration.

7. The apparatus of claim 2 characterized by said current producing means being a rotating booster with fields connected in push-pull relationship and being two silicon controlled rectifiers each of which is in electrical connection with a rectifier bridge whose output is applied to said neutral circuit, said rotating booster producing a substantially continuous current and said silicon controlled rectifiers producing pulses of current of short duration.

8. The apparatus of claim 2 characterized by said current producing means being an adjustable voltage, reversing polarity regulator formed by a pair of rectifier bridges including back-to-back connected silicon controlled rectifiers, said rectifier bridges being resistor coupled, said reversing polarity regulator being connected into said neutral circuit.

9. The apparatus of claim 1 wherein said means connected to said current producing means for actuating same includes a cooperating means which detects a change in operation of a device connected to said first and second shafts and which from said detected change regulates amount of said current which increases the armature current in one of the two pairs of motors and decreases the armature current in the other of the two pairs of motors.

10. The apparatus of claim 2 wherein said means connected to said current producing means for actuating same includes a cooperating means which detects a change in operation of a device connected to said first and second shafts and which from said detected change regulates amount of said current which increases the armature current in one of the two pairs of motors and decreases the armature current in the other of the two pairs of motors.

References Cited by the Examiner

UNITED STATES PATENTS

| | | | |
|---|---|---|---|
| 1,837,803 | 12/1931 | Weston | 318—80 |
| 2,070,323 | 2/1937 | Stokes | 318—105 X |
| 2,193,683 | 3/1940 | Beck | 318—66 |
| 2,523,120 | 9/1950 | Kenyon | 318—99 X |
| 3,077,800 | 2/1963 | Taylor | 80—32 |
| 3,124,020 | 3/1964 | Polakowski | 80—32 |

FOREIGN PATENTS

| | | |
|---|---|---|
| 142,173 | 7/1951 | Australia. |
| 165,655 | 10/1955 | Australia. |
| 741,060 | 11/1955 | Great Britain. |

ORIS L. RADER, *Primary Examiner.*

WILLIAM J. STEPHENSON, *Examiner.*

C. H. HITTON, T. LYNCH, *Assistant Examiners.*